United States Patent
Esterl et al.

(10) Patent No.: US 6,469,571 B2
(45) Date of Patent: Oct. 22, 2002

(54) CHARGE PUMP WITH CHARGE EQUALIZATION FOR IMPROVED EFFICIENCY

(75) Inventors: Robert Esterl; Georg Braun, both of München (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/996,280

(22) Filed: Nov. 28, 2001

(65) Prior Publication Data

US 2002/0075065 A1 Jun. 20, 2002

Related U.S. Application Data

(63) Continuation of application No. PCT/DE00/01715, filed on May 26, 2000.

(30) Foreign Application Priority Data

May 28, 1999 (DE) .......................... 199 24 568

(51) Int. Cl.$^7$ ................................................ G05F 3/02
(52) U.S. Cl. ...................................... 327/536; 327/537
(58) Field of Search ................................. 327/534, 535, 327/536, 537

(56) References Cited

U.S. PATENT DOCUMENTS

| | | | |
|---|---|---|---|
| 4,740,715 A | 4/1988 | Okada | 327/536 |
| 5,126,590 A | 6/1992 | Chern | 327/536 |
| 5,202,588 A | 4/1993 | Matsuo et al. | 327/536 |
| 5,343,088 A | 8/1994 | Jeon | 327/536 |
| 5,406,523 A * | 4/1995 | Foss et al. | 326/88 |
| 5,521,871 A * | 5/1996 | Choi | 327/536 |
| 5,546,296 A | 8/1996 | Savignac et al. | 327/536 |
| 5,625,315 A * | 4/1997 | Matsui et al. | 327/536 |
| 5,748,032 A | 5/1998 | Baek | 327/536 |
| 5,936,459 A | 8/1999 | Hamamoto | 327/536 |
| 6,031,411 A * | 2/2000 | Tsay et al. | 327/534 |

FOREIGN PATENT DOCUMENTS

JP 09231752 9/1997

* cited by examiner

Primary Examiner—Terry D. Cunningham
(74) Attorney, Agent, or Firm—Laurence A. Greenberg; Werner H. Stemer; Ralph E. Locher

(57) ABSTRACT

A charge pump has two inputs, each for an input clock signal, and an output for the output of a pumped output potential. Two pumping capacitors are connected to the inputs. Second electrodes of the pumping capacitors are in each case connected via a first circuit module to a supply potential (ground) and via a second circuit module to the output. Also present is a controllable short-circuiting element, the controllable path of which is disposed between the second electrodes of the two pumping capacitors.

9 Claims, 7 Drawing Sheets

CHARGE PUMP WITH CHARGE EQUALIZATION FOR IMPROVED EFFICIENCY

CROSS-REFERENCE TO RELATED APPLICATION

This application is a continuation of copending International Application No. PCT/DE00/01715, filed May 26, 2000, which designated the United States.

BACKGROUND OF THE INVENTION

Field of the Invention

The invention relates to a charge pump.

Various charge pumps are described in U.S. Pat. Nos. 4,740,715, 5,126,590, 5,202,588 and 5,343,088. The basic operating principle of a charge pump is now described.

A charge pump has two pumping capacitors to each of which an input clock signal is fed at an electrode. Electrodes of the pumping capacitors remote from the input clock signals are connected to ground via transistors and are connected to an output of the charge pump via other transistors. The transistors are p-channel type transistors. The charge pump feeds a load, which has a load capacitance. The control terminals of the transistors are connected to different control signals.

With each clock pulse edge of the input clock signals there is a charge reversal of the electrodes of the pumping capacitors remote from the inputs. As this happens, one electrode must be pumped from the value of the output potential to a positive value and the other electrode must be pumped from 0V to a negative value.

SUMMARY OF THE INVENTION

It is accordingly an object of the invention to provide a charge pump that overcomes the above-mentioned disadvantages of the prior art devices of this general type, with which a more negative output potential can be produced.

With the foregoing and other objects in view there is provided, in accordance with the invention, a charge pump. The charge pump contains two inputs, each for receiving an input clock signal; an output for outputting a pumped output potential; a first circuit module; a second circuit module connected to the output; a supply potential terminal connected to the first circuit module; and two pumping capacitors including a first pumping capacitor and a second pumping capacitor each having a first electrode and a second electrode. The first electrode of each of the pumping capacitors is connected to one of the inputs, and the second electrode of the pumping capacitors is connected to both the first circuit module and the second circuit module. The second electrode in each case is coupled through the first circuit module to the supply potential terminal and through the second circuit module to the output. A controllable short-circuiting element is provided and has a control terminal and a controllable path with a first end connected to the second electrode of the first pumping capacitor and a second end connected to the second electrode of the second pumping capacitor. A first switching element is provided and has a first terminal connected to the second electrode of the first pumping capacitor, a second terminal connected to the control terminal of the controllable short-circuiting element, and a control terminal. A second switching element has a first terminal connected to the second electrode of the second pumping capacitor, a second terminal connected to the control terminal of the controllable short-circuiting element, and a control terminal.

The charge pump according to the invention has a controllable short-circuiting element, the controllable path of which is disposed between the two electrodes of the two capacitors that are remote from the inputs of the charge pump. By the short-circuiting element it is possible in an advantageous way to carry out a charge equalization between the two electrodes of the two pumping capacitors at any desired points in time.

It is particularly favorable if the short-circuiting element is driven by its control terminal in such a way that, immediately before clock pulse edges of the input clock signals, it is conducting, and brings about the charge equalization, and is subsequently blocked again before the clock pulse edges occur. During every pumping period, the potentials of the second electrodes of the pumping capacitors are initially equalized via the short-circuiting element to their arithmetic mean value, before their level is changed by the pumping of the input clock signals. This results in an increase in the absolute amount of the peak values of the potentials at the second electrodes. For this reason, an output potential of a greater absolute amount than without the short-circuiting according to the invention is achieved. The short-circuiting has the effect that a change in potential already takes place to a certain extent at the second electrodes in the direction of the subsequent increase or decrease in potential induced by the input clock signals. As a result, potentials of a greater absolute value are subsequently produced at the second electrodes by the excursion of the input clock signals.

According to a development, the first and second circuit modules are non-conducting whenever the short-circuiting element is conducting. This prevents the supply potential and the pumped output potential from being influenced during the short-circuiting of the second electrodes of the pumping capacitors.

It is favorable if the control signal is periodic. This has the result that every pumping cycle takes place in the way according to the invention.

The first and second switching elements may contain, for example, switching elements such as transistors or diodes for example.

According to a development, the charge pump has a first switching element, via which the control terminal of the short-circuiting element is connected to the second electrode of the first pumping capacitor, and a second switching element, via which the control terminal of the short-circuiting element is connected to the second electrode of the second pumping capacitor. The two switching elements make it possible to adapt the potential at the control terminal of the short-circuiting element to the potential of one of the two second electrodes at desired points in time.

In accordance with an added feature of the invention, a third switching element is connected between the control terminal of the first switching element and the supply potential terminal, and through the third switching element the control terminal of the first switching element is coupled to the supply potential terminal. A fourth switching element is connected between the control terminal of the first switching element and the second electrode of the second capacitor, and through the fourth switching element the control terminal of the first switching element is coupled to the control terminal of the second pumping capacitor. A fifth switching element is connected between the control terminal of the second switching element and the second electrode of the first pumping capacitor, and through the fifth switching element the control terminal of the second switching element is coupled to the second electrode of the first pumping capacitor. A sixth switching element is connected between the control terminal of the second switching element and the supply potential terminal, and through the sixth switching element the control terminal of the second switching element is coupled to the supply potential terminal.

In accordance with an additional feature of the invention, the third switching element has a control terminal connected to the control terminal of the controllable short-circuiting element. The sixth switching element has a control terminal connected to the control terminal of the controllable short-circuiting element. The fourth switching element has a control terminal connected to the control terminal of the second switching element. The fifth switching element has a control terminal connected to the control terminal of the first switching element.

In accordance with a concomitant feature of the invention, a third pumping capacitor has a first electrode connected to the control terminal of the first switching element and a second electrode for receiving a first pumping signal. A fourth pumping capacitor has a first electrode connected to the control terminal of the controllable short-circuiting element and a second electrode for receiving a second pumping signal. A fifth capacitor has a first electrode connected to the control terminal of the second switching element and a second electrode receiving a third pumping signal.

Other features which are considered as characteristic for the invention are set forth in the appended claims.

Although the invention is illustrated and described herein as embodied in a charge pump, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
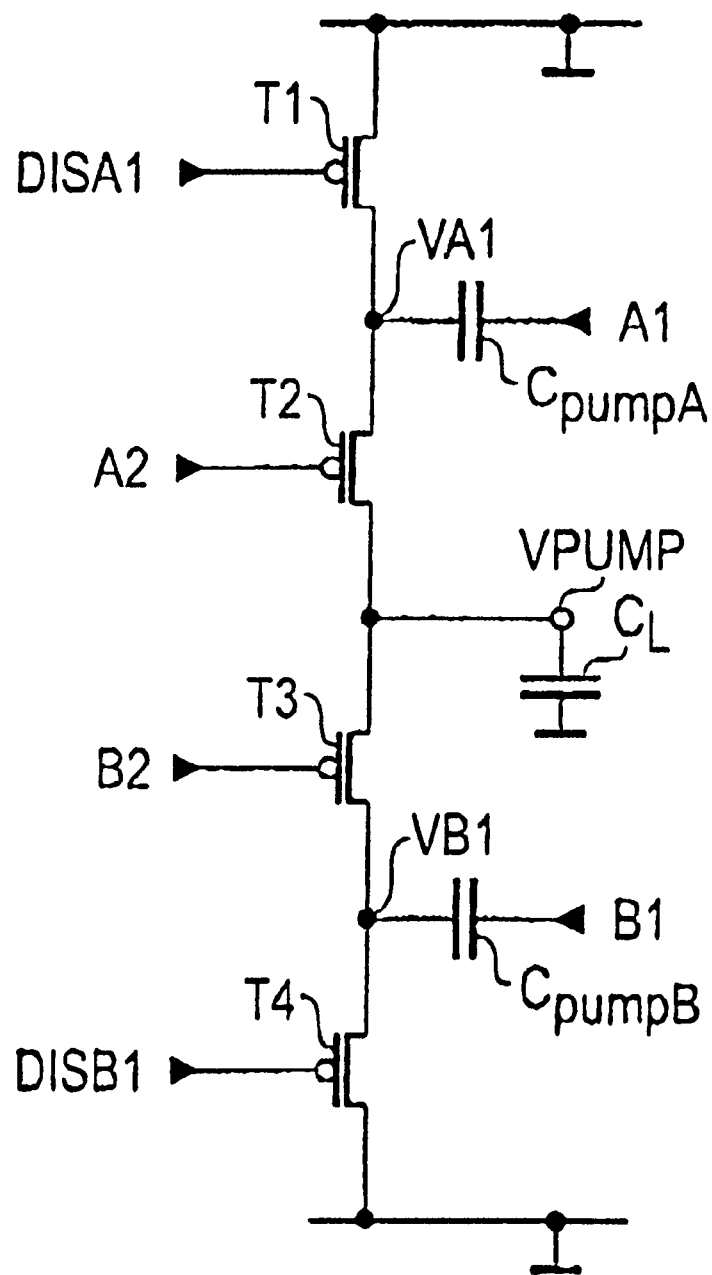
FIG. 1 is a circuit diagram of a conventional charge pump.

Referring now to the figures of the drawing in detail and first, particularly, to FIG. 1 thereof, there is shown a charge pump with two pumping capacitors CpumpA, CpumpB, to each of which an input clock signal A1, B1 is fed at an electrode. Electrodes VA1, VB1 of the pumping capacitors remote from the input clock signals A1, B1 are connected to ground via transistors T1, T4 and are connected to an output of the charge pump via other transistors T2, T3. The transistors T1 to T4 are of the p-channel type. The charge pump feeds a load, which has a load capacitance $C_L$. The control terminals of the transistors T1 to T4 are connected to different control signals DISA1, DISB1, A2, B2.

Figure 2:
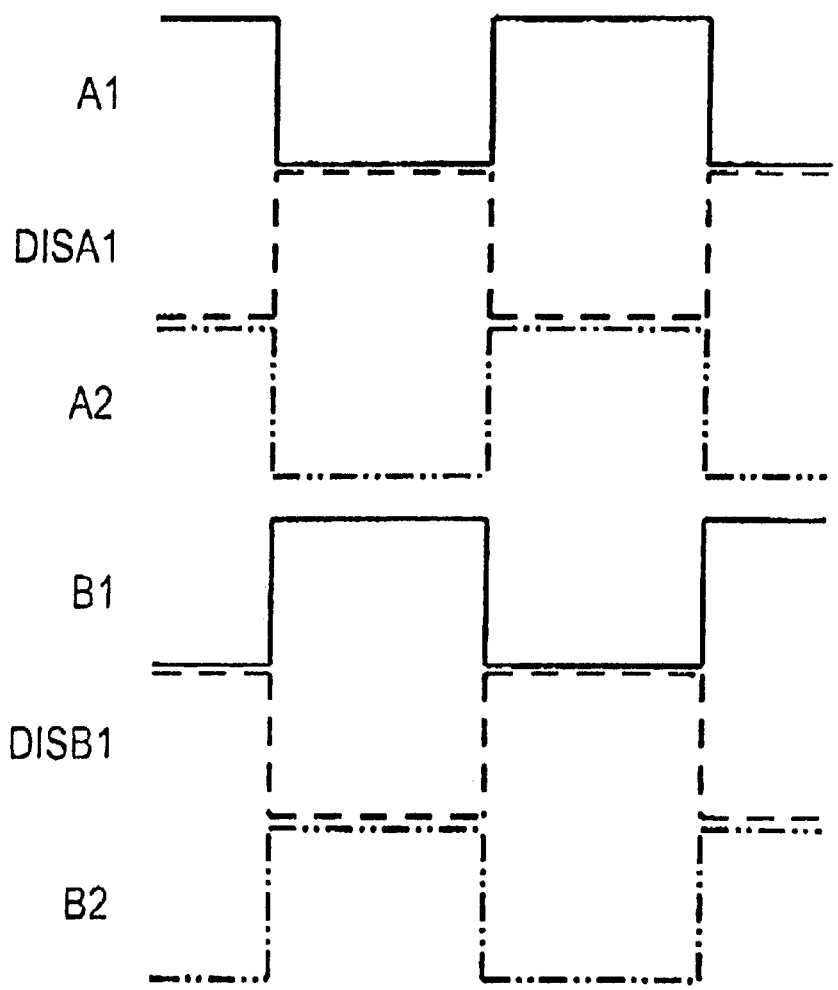
FIG. 2 is a timing diagram showing signal profiles for the charge pump shown in FIG. 1.
Figure 2:
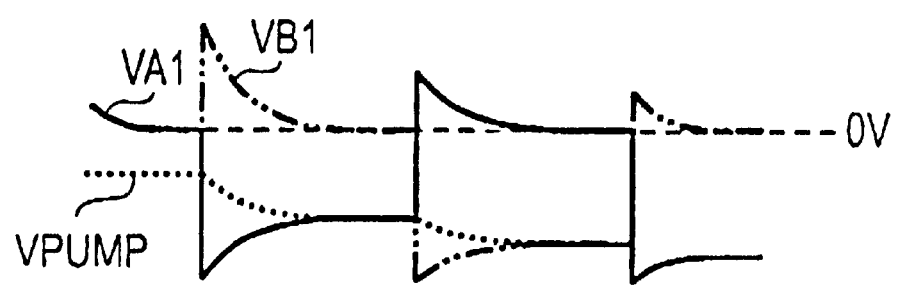

FIG. 2 shows the profiles of the input clock signals A1, B1 and of the control signals DISA1, DISB1, A2, B2 and the profile of the potentials at the switching nodes VA1, VA2 and the profile of the pumped output signal VPUMP at the output of the charge pump. With each clock pulse edge of the input clock signals A1, B1 there is a charge reversal of the electrodes of the pumping capacitors CpumpA, CpumpB remote from the inputs. As this happens, one electrode must be pumped from the value of the output potential to a positive value and the other electrode must be pumped from 0V to a negative value.

Figure 3:
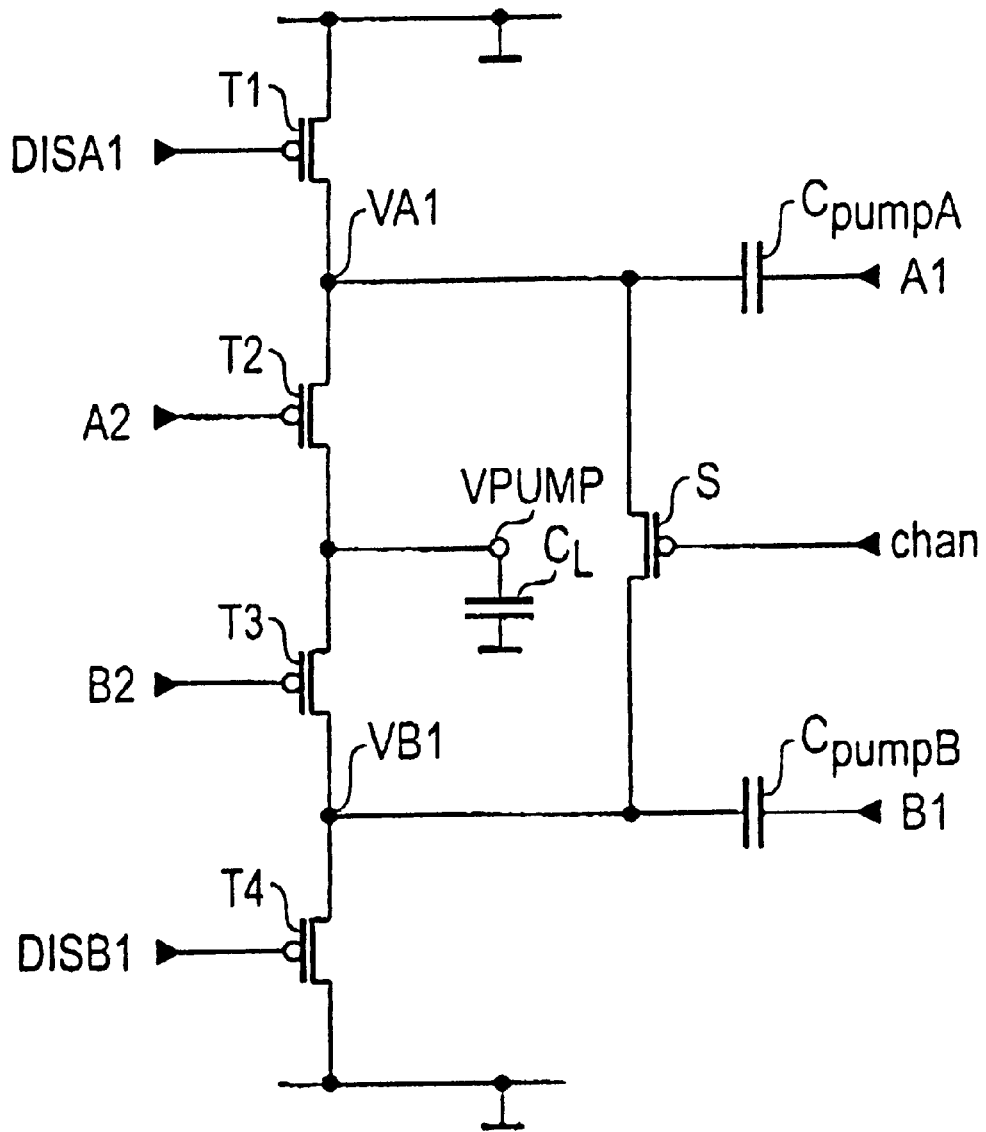
FIG. 3 is a circuit diagram of a first exemplary embodiment of the charge pump according to the invention.

The first exemplary embodiment of the charge pump according to the invention is shown in FIG. 3 and has the components already explained with reference to FIG. 1. In this case, the first electrodes of the pumping capacitors CpumpA, CpumpB are connected to inputs of the charge pump via which the input clock signals A1, B1 are fed. The second electrodes VA1, VB1 of the pumping capacitors are connected via the p-channel transistors T1, T4 to ground and via the p-channel transistors T2, T3 to the output of the charge pump, at which a pumped output potential VPUMP is produced. Via the output, the charge pump feeds the capacitive load $C_L$. The control terminals of the transistors T1 to T4 are fed the control signals DISA1, DISB1, A2, B2. In addition, the second electrodes of the pumping capacitors CpumpA, CpumpB are connected to one another via a short-circuiting element S in the form of a further p-channel transistor. The control terminal of the short-circuiting element S is fed a control signal chan.

Figure 4:
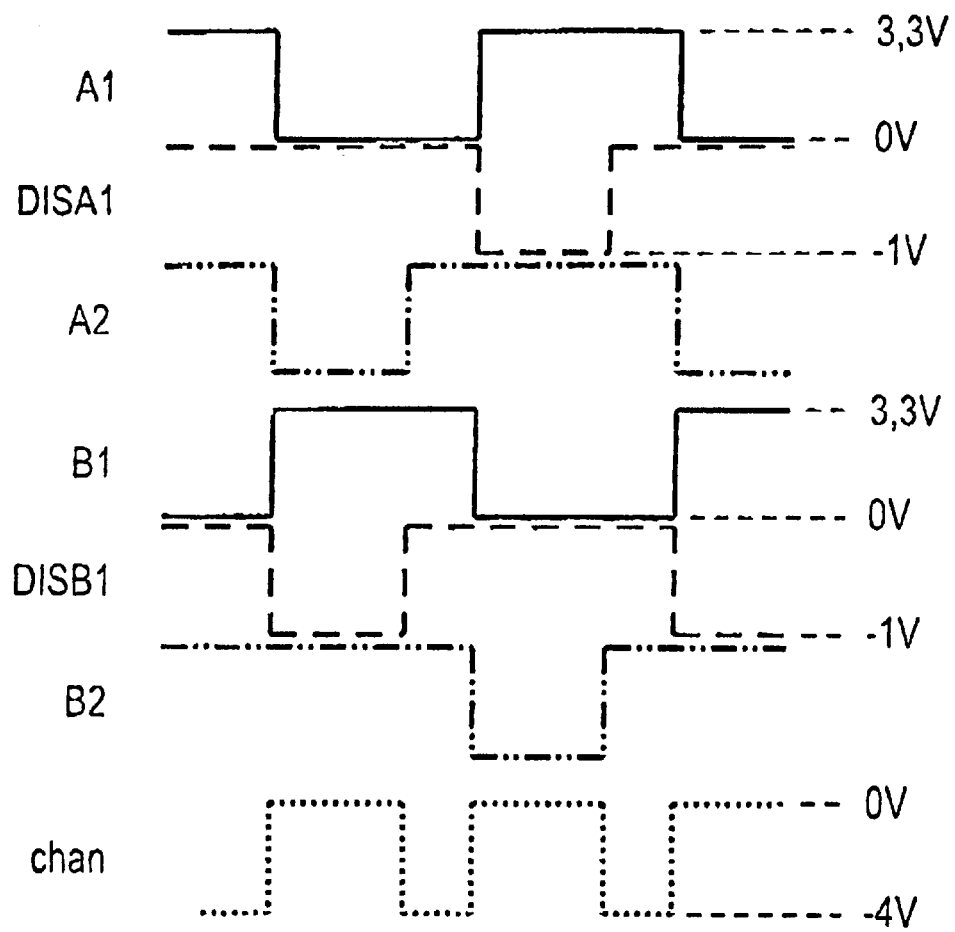
FIG. 4 is a timing diagram showing signal profiles for the charge pump shown in FIG. 3.
Figure 4:
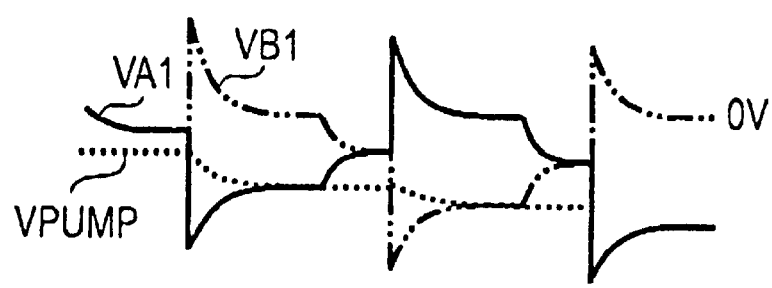

FIG. 4 shows for the exemplary embodiment shown in FIG. 3 exemplary profiles of the input clock signals A1, B1, of the control signals DISA1, DISB1, A2, B2, chan, of the potentials at the second electrodes VA1, VB1 of the pumping capacitors CpumpA, CpumpB and of the pumped output potential VPUMP at the output of the charge pump. It can be seen that, when the short-circuiting element S is conducting (low level of the control signal chan), the transistors T1 to T4 are turned off. The short-circuiting element S is briefly switched to conduct before each change in level of the mutually inverse input clock signals A1, B1, so that a charge equalization takes place between the second electrodes VA1, VB1 of the pumping capacitors.

The charge pump of the exemplary embodiment serves for producing a negative pumped output potential VPUMP. Therefore, before the low potential occurs at the control terminal of the short-circuiting element S, the potentials at the second electrodes VA1, VB1 alternately assume ground potential (0V) and the value of the output potential VPUMP, respectively. The reason for this is that the second electrode VA1 of the one pumping capacitor CpumpA is always conductively connected to ground via the corresponding transistor T1 whenever the second electrode VB1 of the other pumping capacitor CpumpB is conductively connected to the output of the charge pump via the corresponding transistor T3, and vice versa. Once the potentials of the second electrodes VA1, VB1 have assumed 0V and the value of the output potential VPUMP, respectively, the corresponding transistors are turned off, so that subsequently all four transistors T1 to T4 are turned off. Therefore, in contrast with the input clock signals A1, B1, the periodic control signals DISA1, DISB1, A2, B2 are unsymmetrical clocks. During the time period before the next clock pulse edge of the input clock signals A1, B1, during which the four transistors T1 to T4 are turned off, the short-circuiting element S is switched to conduct via the control signal chan. The charge equalization which then takes place between the second electrodes VA1, VB1 of the pumping capacitors has the effect that a potential which corresponds to the arithmetic mean value between the current value of the output potential VPUMP and 0V occurs at the two electrodes. At the latest when the next edge of the input clock signals A1, B1 occurs, the short-circuiting element S is blocked again, so that the potentials of the second electrodes VA1, VB1 are pumped by the input clock signals to opposite maximum and minimum values, respectively.

Since FIG. 4 represents a time segment during which the output potential VPUMP has not yet assumed its final negative value, the positive and negative peaks of the potentials at the second electrodes VA1, VB1 shift in the negative direction with every half-period of the input clock signals A1, B1. The same applies to the mean value occurring during the conducting phase of the short-circuiting element S.

Figure 5:
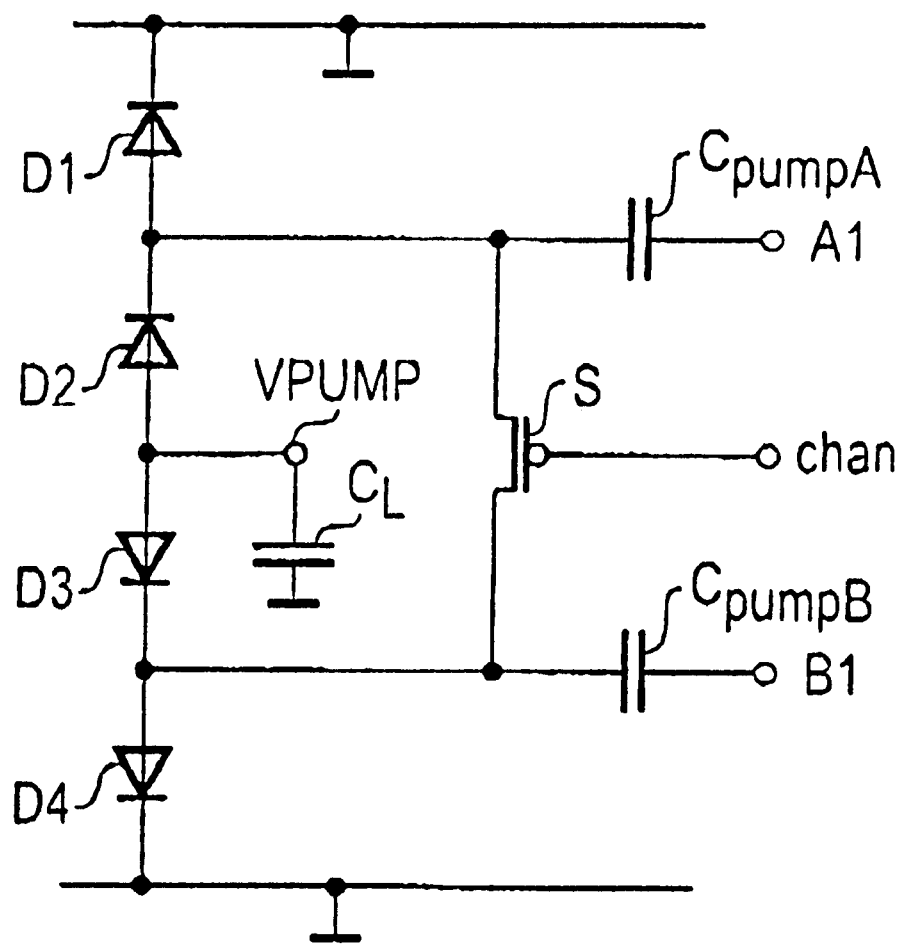
FIG. 5 is a circuit diagram of a second exemplary embodiment of the charge pump according to the invention.

FIG. 5 shows a second exemplary embodiment of the charge pump according to the invention. FIG. 5 differs from the exemplary embodiment from FIG. 3 in that the p-channel transistors T1 to T4 are replaced by diodes D1 to D4. This dispenses with the control signals DISA1, DISB1, A2, B2. The input clock signals A1, B1 and the control signal chan of the short-circuiting element S also have the profile shown in FIG. 4 for the exemplary embodiment represented in FIG. 5. The potentials at the second electrodes VA1, VB1 of the pumping capacitors CpumpA, CpumpB and of the output potential are also similar to those represented in FIG. 4. However, the maximum values (peaks) of the potentials at the second electrodes VA1, VB1 are reduced in absolute terms by the value of the inception voltages of the diodes D1 to D4.

Figure 6:
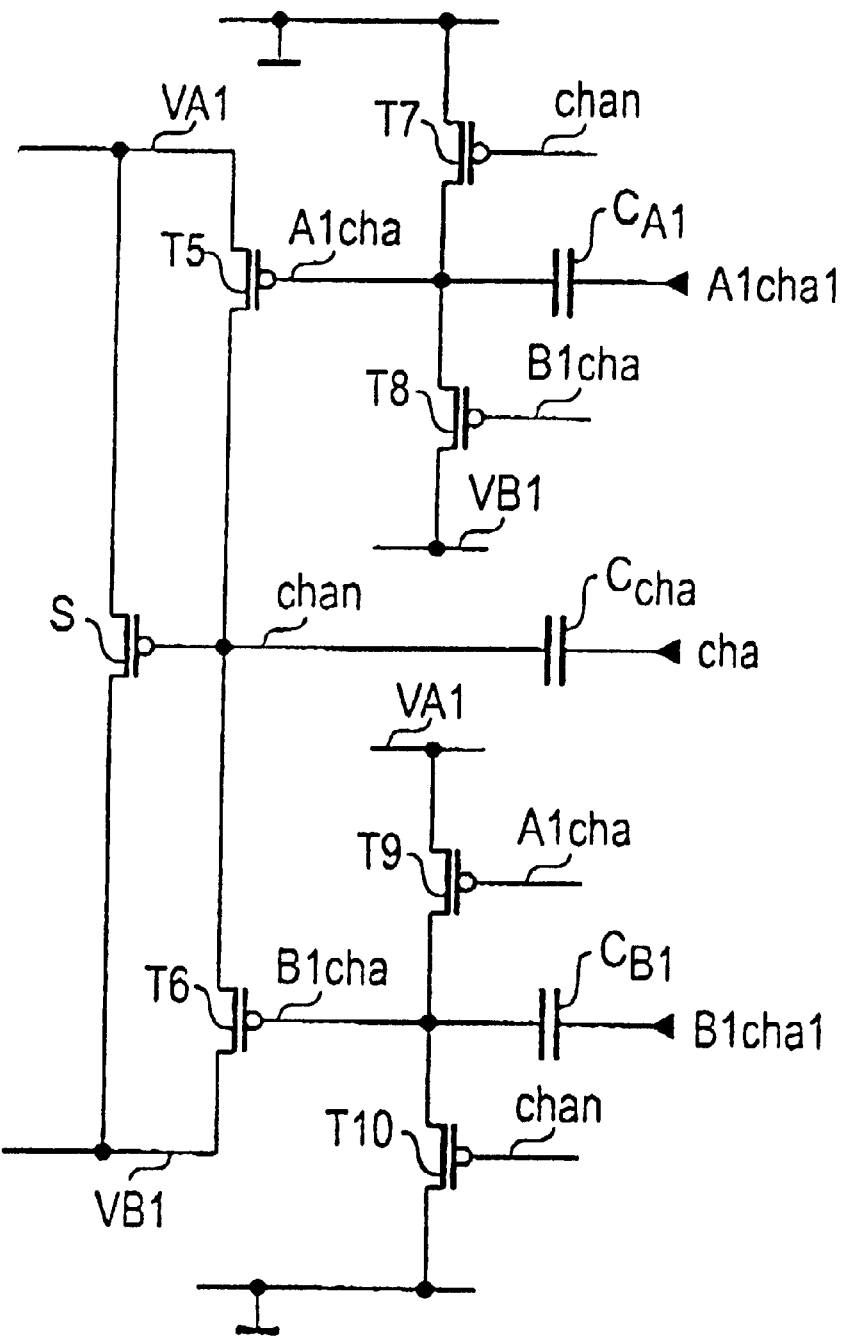
FIG. 6 is a circuit diagram of a detail of a further exemplary embodiment of the charge pump.

FIG. 6 shows a detail of a further exemplary embodiment of the charge pump according to the invention. The further exemplary embodiment has the components represented in FIG. 3 and additionally those shown in FIG. 6. FIG. 6 shows the short-circuiting element S from FIG. 3 between the two electrodes VA1, VB1 of the two pumping capacitors CpumpA, CpumpB. The control terminal of the short-circuiting element S is connected via a fifth transistor T5 to the second electrode VA1 of the first pumping capacitor CpumpA and via a sixth transistor T6 to the second electrode VB1 of the second pumping capacitor CpumpB.

The subcircuit shown in FIG. 6 is fed three pumping signals A1cha1, cha, B1cha1. The first pumping signal A1cha1 is connected via a third pumping capacitor CA1 to the control terminal of the fifth transistor T5. The second pumping signal cha is connected via a fourth pumping capacitor Ccha to the control terminal of the short-circuiting element S. The third pumping signal B1cha1 is connected via a fifth pumping capacitor CB1 to the control terminal of the sixth transistor T6.

Furthermore, the control terminal of the fifth transistor T5 is connected through a seventh transistor T7 to ground and through an eighth transistor T8 to the second electrode VB1 of the second pumping capacitor CpumpB. The control terminal of the sixth transistor T6 is connected through a ninth transistor T9 to the second electrode VA1 of the first pumping capacitor CpumpA and through a tenth transistor T10 to ground. The transistors T5 to T10 are p-channel transistors.

A control terminal of the seventh transistor T7 and of the tenth transistor T10 are connected to the control terminal of the short-circuiting element S. A control terminal of the eighth transistor T8 is connected to the control terminal of the sixth transistor T6 and a control terminal of the ninth transistor T9 is connected to the control terminal of the fifth transistor T5.

Figure 7:
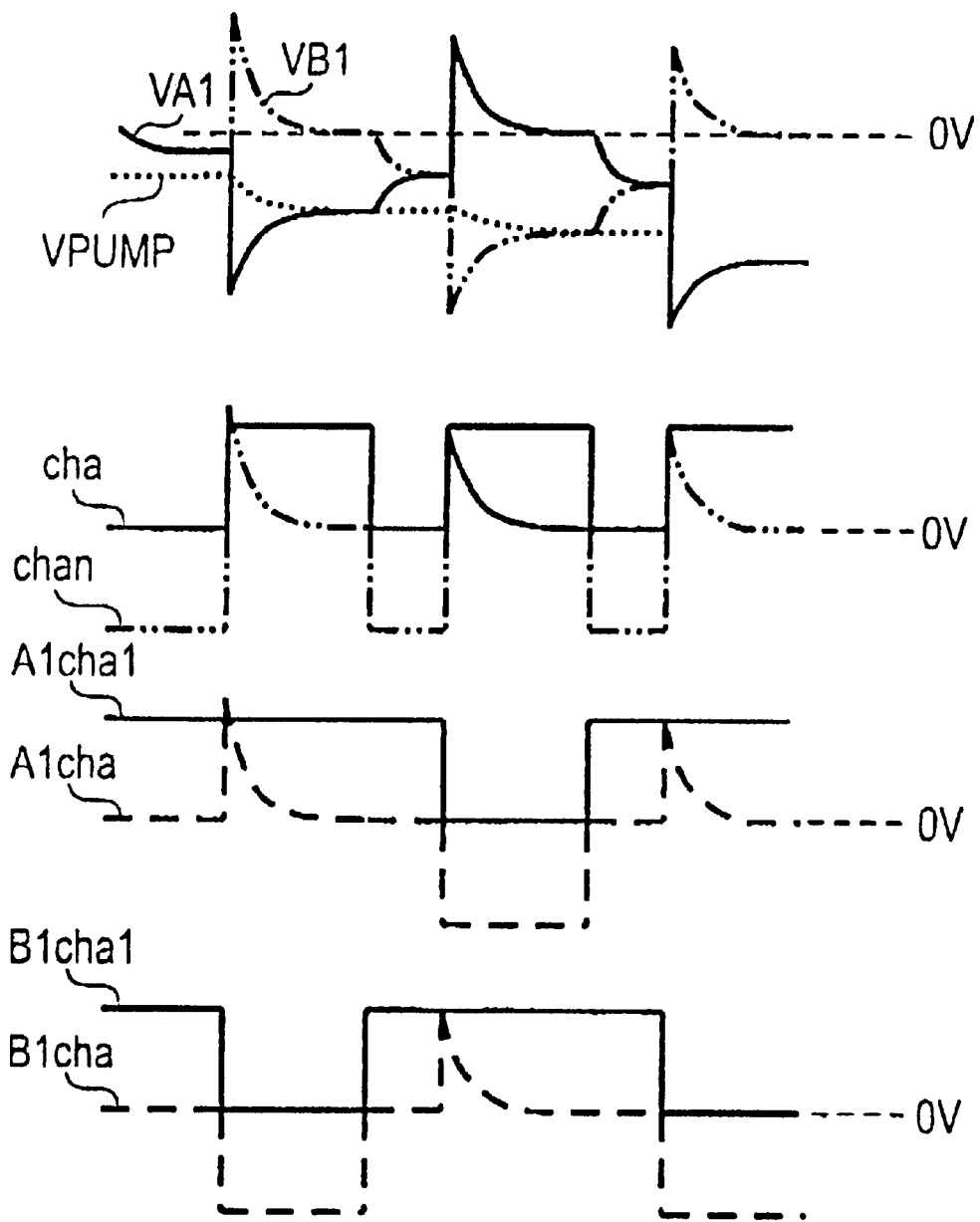
FIG. 7 is a timing diagram of signal profiles for the charge pump shown in FIG. 6.

FIG. 7 shows profiles of the signals depicted in FIG. 6. It can be seen that the fifth transistor T5 and the sixth transistor T6 are turned off as long as the short-circuiting element S is conducting (chan=low level). As soon as one of the second electrodes VA1, VB1 is pumped by the corresponding input clock signal A1, B1 to a positive value (positive edge of these signals), the transistor T5 or T6 connected to the second electrode is turned on. Consequently, the potential chan at the control terminal of the short-circuiting element S subsequently follows the profile of the potential at the second electrode VA1, VB1 conductively connected to it. This produces the positive peaks of the signal chan. In this way it is ensured that the short-circuiting element S, which is a p-channel transistor, is reliably blocked. This is because at its control terminal there is then always a potential chan that is at least as high as its source potential.

The seventh transistor T7 and the tenth transistor T10 ensure that the fifth transistor T5 and the sixth transistor T6, respectively, are reliably turned off, while the short-circuiting element S is conducting. In this case (chan=low level), ground is applied via the seventh transistor T7 and the tenth transistor T10 to the control terminals of the fifth transistor T5 and sixth transistor T6. Consequently, the gate-source voltage of the last-mentioned transistors is then positive, so that they are reliably turned off.

The eighth transistor T8 serves the purpose of reliably turning off the fifth transistor T5 when the short-circuiting element S is blocked (chan=high level) and the sixth transistor T6 is turned on (B1cha=low level). If the eighth transistor T8 is turned on, the potential of the second electrode VB1 of the second pumping capacitor CpumpB is applied to the control terminal of the fifth transistor T5. Since the potential chan at the gate of the short-circuiting element S is at the same time conductively connected to the second electrode VB1 of the second pumping capacitor CpumpB, the gate-source voltage of the fifth transistor T5 is then equal to 0. It is consequently reliably turned off.

The ninth transistor T9 serves the purpose in an analogous way of turning off the sixth transistor T6, while the short-circuiting element S is blocked and the fifth transistor T5 is turned on.

Consequently, while the fifth transistor T5 and the sixth transistor T6 serve the purpose of reliably blocking the short-circuiting element S during its blocking phase, the transistors T7 to T10 serve the purpose of reliably turning off the fifth transistor T5 or the sixth transistor T6 during their different off phases. In this way, the charge pump of the exemplary embodiment avoids undesired influencing of the potentials of the second electrodes VA1, VB1 of the pumping capacitors CpumpA, CpumpB, because disturbing leakage currents are avoided.

We claim:

1. A charge pump, comprising:

two inputs, each for receiving an input clock signal;

an output for outputting a pumped output potential;

a first circuit module;

a second circuit module connected to said output;

a supply potential terminal connected to said first circuit module;

two pumping capacitors including a first pumping capacitor and a second pumping capacitor each having a first electrode and a second electrode, said first electrode of each of said pumping capacitors connected to one of said inputs, said second electrode of said pumping capacitors connected to both said first circuit module and said second circuit module, said second electrode in each case coupled through said first circuit module to said supply potential terminal and through said second circuit module to said output;

a controllable short-circuiting element having a control terminal and a controllable path with a first end connected to said second electrode of said first pumping capacitor and a second end connected to said second electrode of said second pumping capacitor;

a first switching element having a first terminal connected to said second electrode of said first pumping capacitor, a second terminal connected to said control terminal of said controllable short-circuiting element, and a control terminal; and a second switching element having a first terminal connected to said second electrode of said second pumping capacitor, a second terminal connected to said control terminal of said controllable short-circuiting element, and a control terminal.

2. The charge pump according to claim 1, wherein said control terminal of said short-circuiting element receives a control signal which switches said controllable short-circuiting element to conduct and blocks said controllable short-circuiting element again immediately before clock pulse edges of the input clock signals.

3. The charge pump according to claim 2, wherein said first and second circuit modules are non-conducting whenever said controllable short-circuiting element is conducting.

4. The charge pump according to claim 2, wherein the control signal is a periodic control signal.

5. The charge pump according to claim 1, wherein:

said first circuit module has first circuit switching elements with first controllable paths each coupling said second electrode of one of said pumping capacitors to said supply potential terminal; and said second circuit module has second circuit switching elements with second controllable paths each coupling said second electrode of one of said pumping capacitors to said output.

6. The charge pump according to claim 1, wherein said first and second circuit modules contain diodes.

7. The charge pump according to claim 1, including:

a third switching element connected between said control terminal of said first switching element and said supply potential terminal, and through said third switching element said control terminal of said first switching element is coupled to said supply potential terminal;

a fourth switching element connected between said control terminal of said first switching element and said second electrode of said second capacitor, and through said fourth switching element said control terminal of said first switching element is coupled to said second electrode of said second pumping capacitor;

a fifth switching element connected between said control terminal of said second switching element and said second electrode of said first pumping capacitor, and through said fifth switching element said control terminal of said second switching element is coupled to said second electrode of said first pumping capacitor; and a sixth switching element connected between said control terminal of said second switching element and said supply potential terminal, and through said sixth switching element said control terminal of said second switching element is coupled to said supply potential terminal.

8. The charge pump according to claim 7, wherein:

said third switching element has a control terminal connected to said control terminal of said controllable short-circuiting element;

said sixth switching element has a control terminal connected to said control terminal of said controllable short-circuiting element;

said fourth switching element has a control terminal connected to said control terminal of said second switching element; and said fifth switching element has a control terminal connected to said control terminal of said first switching element.

9. The charge pump according to claim 1, including:

a third pumping capacitor having a first electrode connected to said control terminal of said first switching element and a second electrode receiving a first pumping signal;

a fourth pumping capacitor having a first electrode connected to said control terminal of said controllable short-circuiting element and a second electrode for receiving a second pumping signal; and a fifth capacitor having a first electrode connected to said control terminal of said second switching element and a second electrode receiving a third pumping signal.

* * * * *